United States Patent [19]

Jernbäcker

[11] Patent Number: 5,694,470
[45] Date of Patent: Dec. 2, 1997

[54] SYSTEM FOR READING ENCRYPTED INFORMATION, AND UNIT FOR USE IN SUCH A SYSTEM

[75] Inventor: Lars Jernbäcker, Växjö, Sweden

[73] Assignee: Telub Teknik AB, Vaxjo, Sweden

[21] Appl. No.: 436,228

[22] PCT Filed: Nov. 10, 1994

[86] PCT No.: PCT/SE94/01056

§ 371 Date: May 17, 1995

§ 102(e) Date: May 17, 1995

[87] PCT Pub. No.: WO95/14338

PCT Pub. Date: May 26, 1995

[30] Foreign Application Priority Data

Nov. 17, 1993 [SE] Sweden ................... 9303817

[51] Int. Cl.⁶ ........................................... H04L 9/00
[52] U.S. Cl. ........................ 380/23; 380/4; 380/9; 380/25; 380/49
[58] Field of Search ............................ 380/4, 9, 23, 25, 380/49, 50

[56] References Cited

U.S. PATENT DOCUMENTS

| | | | |
|---|---|---|---|
| 4,471,163 | 9/1984 | Donald et al. | 380/4 |
| 5,067,155 | 11/1991 | Bianco et al. | 380/25 |
| 5,103,476 | 4/1992 | Waite et al. | 380/4 |
| 5,123,045 | 6/1992 | Ostrovsky et al. | 380/4 |
| 5,144,659 | 9/1992 | Jones | 380/4 |
| 5,233,658 | 8/1993 | Bianco et al. | 380/25 |
| 5,319,705 | 6/1994 | Halter et al. | 380/4 |
| 5,377,264 | 12/1994 | Lee et al. | 380/4 |
| 5,402,492 | 3/1995 | Goodman et al. | 380/25 |

*Primary Examiner*—Bernarr E. Gregory

[57] ABSTRACT

A computer system for reading encrypted information is disclosed. A unit (24) for decrypting the information is open only as long as a display tool (A4) occupies a system-modal operative mode (SM). In this system-modal operative mode, the display tool (A4) emits, to the decrypting unit (24), a predetermined enabling signal (BS) without which the decrypting function does not work. When the display tool occupies the system-modal operative mode, the user does not have access to the user functions not defined by the display tool, thereby preventing unauthorized copying, storage and the like of the decrypted information.

15 Claims, 4 Drawing Sheets

SYSTEM FOR READING ENCRYPTED INFORMATION, AND UNIT FOR USE IN SUCH A SYSTEM

In general, this invention concerns a computer system for reading encrypted information, as well as a decrypting unit for use in such a system.

To be more specific, the computer system according to the invention is of the type defined in claim 1, i.e. comprising a decrypting unit for receiving encrypted information and being operable either in a converting state (referred to as an "open" state) in which it converts said encrypted information into corresponding decrypted information, or in a non-converting state (referred to as a "locked" state) in which no decryption of said encrypted information is possible by said decryption unit, said decryption unit being operable in the converting state only if it receives a predetermined external decryption key; and a display tool for displaying said decrypted information to a user.

In the following description and the appended claims, the term "display tool" will be used for designating the applications software for displaying the decrypted information to the user.

As a rule, prior-art cryptographic computer systems are designed for safe transmission of information from an emitter to a receiver, in which case the information is first encrypted by the encrypting unit of the emitter with the aid of an encryption key and then, after being transmitted in encrypted form on a communication link, decrypted by the decrypting unit of the receiver with the aid of a decryption key corresponding to the encryption key.

The decrypting unit can be implemented as software or hardware, or a combination thereof. For instance, a decrypting unit available on the market consists of a so-called cryptocard (by which is meant that the unit has an encrypting as well as a decrypting function) which is to be mounted in a personal computer or the like and be connected to an external bar code reader for reading a separate bar code constituting the decryption key.

In such prior-art systems, the encryption serves to prevent unauthorised monitoring of the information being transmitted on the communication link. Once the receiver has decrypted the information, no security requirements are normally placed on the receiver's management of the decrypted information.

Behind the invention lies a demand for the possibility of decrypting the encrypted information and displaying it to a user in a secure and reliable manner, so that the user is unable to manage or process the decrypted information in an unauthorised way. A special, however not compulsory, object of the invention is to prevent unauthorised copying, storage and the like of the decrypted information, such that the decrypted information is not stored in decrypted form once the user that has employed the display tool for reading the decrypted information has stopped reading. Printout of the decrypted information may, however, be allowed to some extent, especially if the user needs to take the decrypted information with him to some other location.

Today's cryptographic computer systems do not meet this demand. In, say, a personal computer operating under the operating systems DOS/Windows™ and having a cryprocard of the above type, the user has, as soon as the cryptocard has been unlocked by the decryption key, perfect control over the decrypted information provided by the decrypting unit. If the encrypted information is stored on e.g. a CD-ROM and is read by means of a CD-ROM reader connected to the personal computer, the reader may constitute a specific "unit", say unit d. By using conventional DOS commands (XCOPY, COPY, etc.) or conventional copying functions of application programs under DOS or Windows™, the user has every possibility, as soon as the cryptocard has been unlocked, to copy the decrypted information from unit d to any other unit, for instance unit c (hard disc) or unit a (floppy disc), and/or to request a printout of all the decrypted information.

The object of the invention is, therefore, to meet the above demand.

According to the invention, this object is achieved by a computer system in which the decrypting unit is able to pass from the locked to the open state only if it receives a predetermined enabling signal in addition to the predetermined external key, the display tool can be brought to a system-modal operative mode, and the display tool is adapted to emit the predetermined enabling signal to the decrypting unit, however only if it is in the system-modal operative mode.

By the term "system-modal operative mode" is here meant a special operative mode for the display tool (applications software), in which it is located on an overprioritised system level in relation to the other functions of the computer system. In terms of function, a "system-modal operative mode" for the display tool means that the user has access only to those user functions that are defined by the display tool, for as long as the display tool is system-modal. Thus, any other application programs of the computer system, such as tools for file management or word processing, are blocked when the display tool is system-modal. Also user functions on system level, i.e. operating-system functions, such as the DOS command XCOPY, are inaccessible when the display tool is system-modal.

The term "system-modal operative position" is previously known, e.g. for the graphic operating system Windows™. In this window-based operating system, a "system-modal operative position" means that a user involved in a dialogue with a system-modal window is unable to perform other user functions than those available in this system-modal window. Take, for instance, the case of a breakdown of the graphic operating system. Then, a special dialogue box is normally displayed, providing information on the type of error. This dialogue box is frequently system-modal, and the user is compelled to select e.g. "OK" or the like in order to proceed. Such a dialogue box is referred to as "compelling". In particular, the user is unable, for as long as such a system-modal or compelling dialogue box is displayed, to switch to another application program or to functions on operating-system level.

It should, however, be emphasised that the term "system-modal operative mode" should here be interpreted in the wide sense according to the general definition given above and should be regarded as encompassing not only window-based graphic operating systems.

The term "system-modal operative mode" also covers the possibility of automatically closing all other application programs when the display tool is rendered system-modal.

In an especially preferred embodiment of the invention, the computer system is distinguished by the fact that the display tool has no user functions of its own for copying, storage or the like of the decrypted information. In this preferred embodiment, the user thus cannot store a decrypted version of the information for use later on. The expression "copying, storage or the like of the decrypted information" is meant to encompass all other copying and storage alternatives than mere printout of the information, i.e. all types of storage on magnetic, electronic or optical media are impossible. For instance, the expression "or the like" encompasses various clipboard functions. In this preferred embodiment of the invention, the display tool may thus have user functions for limited printout, e.g. of no more than a predetermined number of pages, in compliance with the desired security level. One reason for nevertheless having a certain printout capability is that it should be possible for the user to have this restricted information on paper if he has to have access to a certain amount of the decrypted information at some other place of work. Such a printout function of the display tool may be arranged to provide a special screen marking over each page that is printed out, in which case the screen marking enables reading of the printout but renders all copies black. Such a screen marking may itself include a legible text, such as "must not be copied".

In one embodiment of the invention, the computer system is distinguished by the fact that the display tool is adapted to pass to the system-modal operative mode in response to the input of a predetermined user password. In combination with an algorithm of the display tool, the user password may be employed for generating the predetermined enabling signal to the decrypting unit.

In an especially preferred embodiment, the computer system is characterised in that the decrypting unit comprises a watchdog which is adapted to monitor the reception by the decrypting unit of the predetermined enabling signal in order to compel the decrypting unit to its locked state if the enabling signal is not correctly received. In this embodiment, the system is even more secure in the event of a breakdown (crash) of the display tool for one reason or another. Should this occur, it is recorded by the watchdog in the form of the non-appearance of a correct enabling signal, and the decrypting unit is compelled to pass to the locked state.

In a preferred embodiment, the predetermined enabling signal may consist of a unique bit sequence which is repeatedly generated at set intervals by means of the display tool, in which case the watchdog compels the decrypting unit to pass to the locked state if the unique bit sequence is not repeatedly received within the set intervals. This embodiment of the invention illustrates the fact that the predetermined enabling signal does not necessarily have to be supplied to the decrypting unit in the form of information or a signal which is continuous over time. However, the decrypting unit is never able to pass to the open state if the predetermined enabling signal has not been received.

Preferably, the decrypting unit is entirely implemented as hardware, such as a separate card for a personal computer. This prevents unauthorised modifications of the decrypting unit aiming at eliminating those blocking functions that require the reception of both the decryption key and the predetermined enabling signal for allowing the decrypting unit to pass to the open state.

The invention is especially, albeit not exclusively, applicable to a computer system which operates with windows and in which the encrypted information is read from a storage medium of CD-ROM type.

These and other distinctive features, objects and advantages of the invention are stated in the appended claims and also appear from the following description.

BRIEF DESCRIPTION OF THE DRAWINGS

Embodiments of the invention will now be described in more detail with reference to the accompanying drawings, in which FIG. 1 schematically illustrates a computer system in which the invention is implemented.

DETAILED DESCRIPTION OF THE PREFERRED EMBODIMENT

Figure 1:
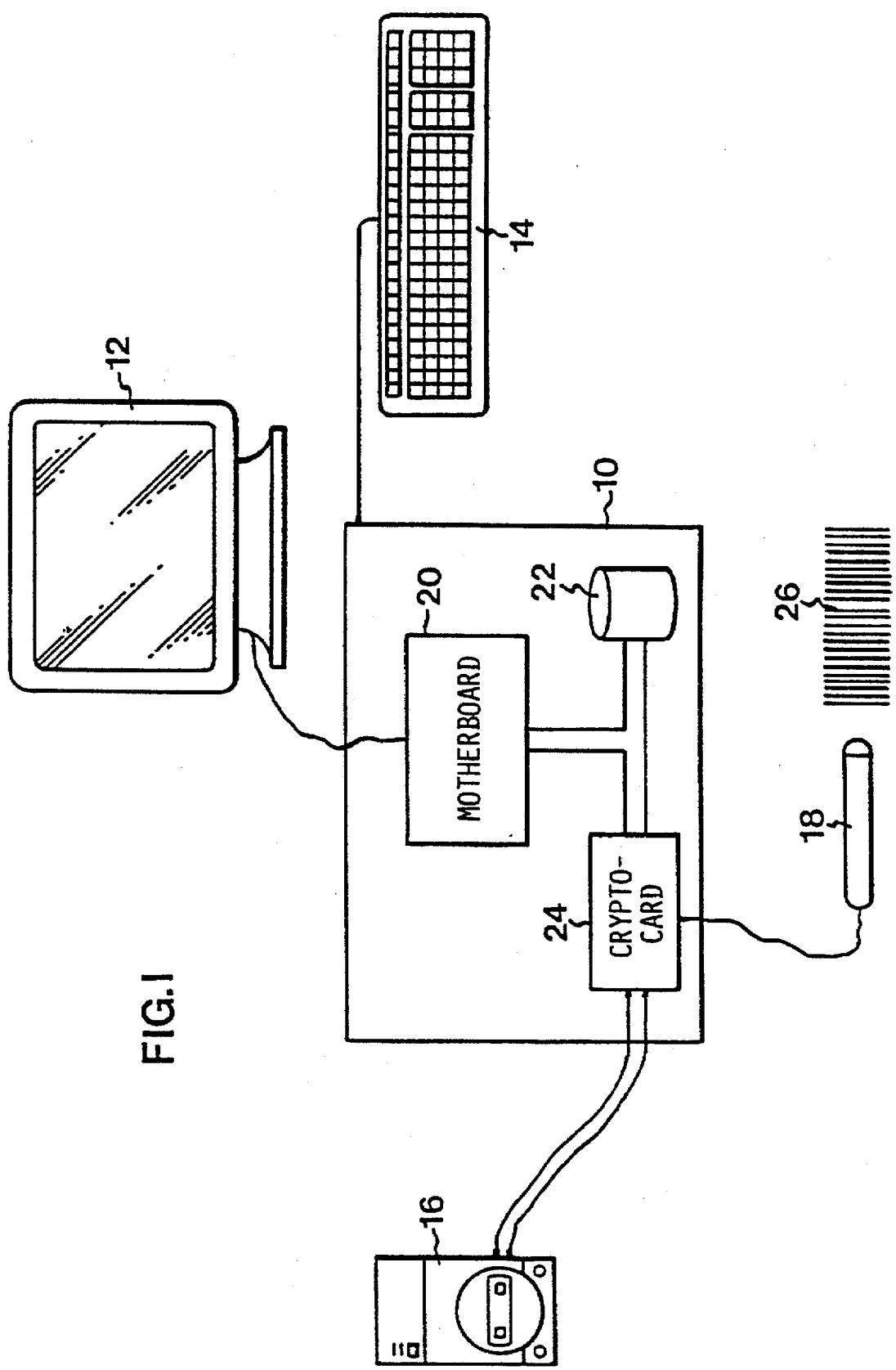

The computer system of FIG. 1 comprises a personal computer 10 which is connected to a display device 12, a keyboard 14, a CD-ROM reader 16, and a bar code reader 18. The personal computer 10 consists, inter alia, of a motherboard 20, a hard disc 22 and a cryptocard 24.

Normally, the user interface has of various application programs, in the following referred to as tools. A specific tool termed the display tool is intended to provide a display of the decrypted information on the display device 12.

The bar code reader 18, which here is in the form of a pen reader, is used for reading a predetermined decryption key 26 in the form of a bar code.

With today's technique and without using the invention, a user who has access to the computer system of FIG. 1 may copy decrypted information onto the hard disc 22 as soon as the cryptocard 24 has been unlocked by means of the key 26. How this can be prevented with the aid of the invention will now be described in more detail with reference to FIGS. 2, 3 and 4.

This embodiment concerns a computer system operating under a window-based operating system, such as Windows™, but as mentioned in the foregoing, the invention is not restricted thereto.

Figure 2:
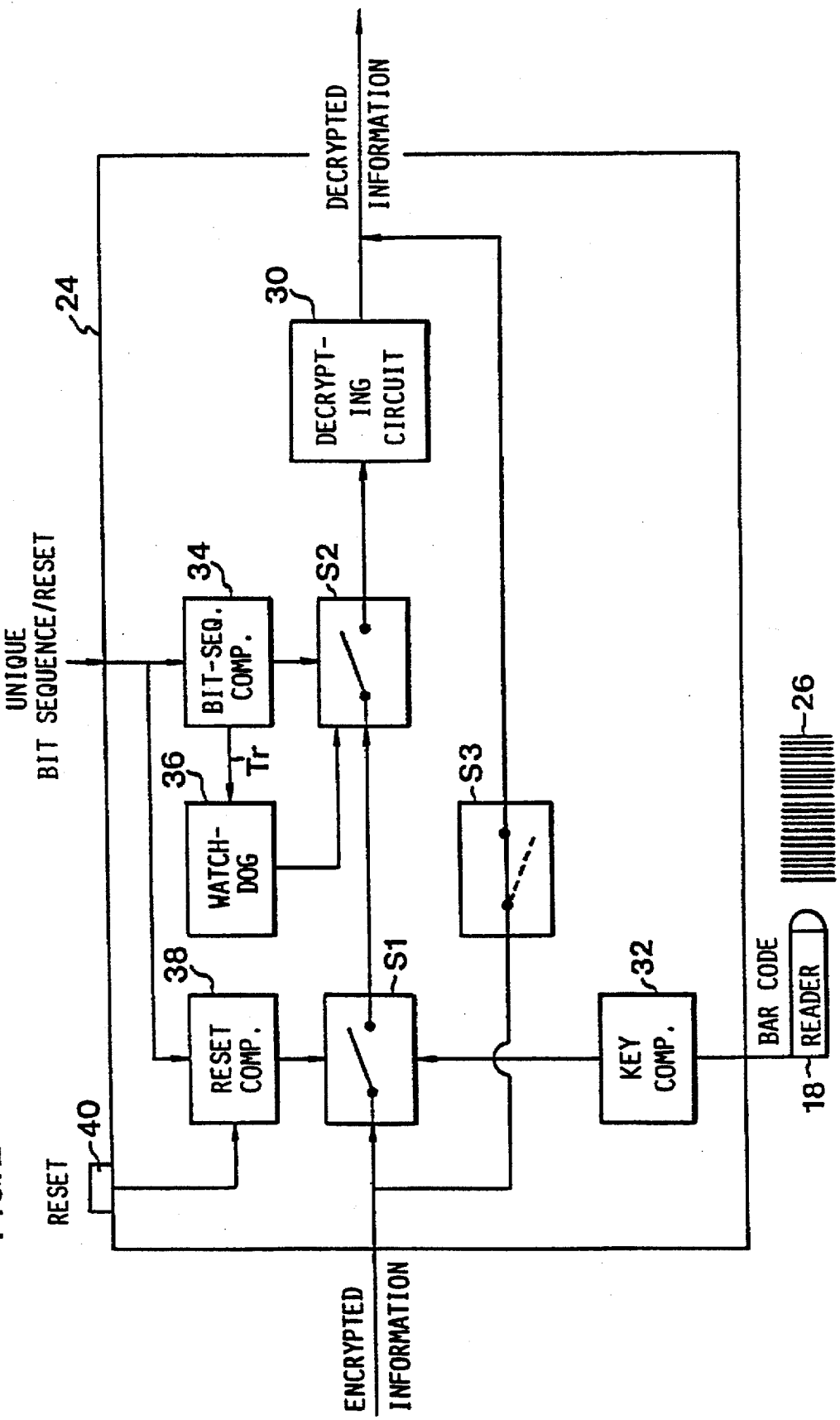
FIG. 2 is a simplified block diagram illustrating the design of an inventive cryptocard for use in the computer system of FIG. 1.

FIG. 2 illustrates schematically and in block form the function of an inventive cryptocard to be used as the cryptocard 24 in FIG. 1. It should be emphasized that the blocks shown as separate units in FIG. 2 may often, in actual practice, be implemented as a single or but a few integrated circuits.

The cryptocard 24 is equipped with a decrypting circuit 30, which basically may be of any known type. Since usable cryptochips are well-known and do not in themselves form part of the present invention, this circuit will be not be described in more detail here. However, the artisan may well combine, in one and the same integrated circuit, the functions of such a known cryptochip with other, new functions of the card in FIG. 2.

Via two switches S1 and S2 which are connected in series and initially are open, the decrypting circuit 30 receives encrypted information from a storage medium of CD-ROM type. The switch S1, which has a holding function, is controlled by a key comparator 32, which is connected to the pen reader 18 and, at its output, can force the switch S1 into a closed position. The switch S2, which also has a holding function, is controlled by a bitsequence comparator 34 which, at its output, can force the switch S2 into a closed position. Further, the cryptocard 24 has a watchdog timer 36, which receives trigger signals Tr from the bit-sequence comparator 34 and which, at its output, can force the switch S2 (open) into a blocking position. Moreover, there is provided a RESET comparator 38 which, at its output, can force the switch S1 into a blocking position. By operating a RESET button 40, the RESET comparator 38 can be made to interrupt the connection through S1.

The card 24 is further equipped with a third switch S3, which is logically controlled in antiparallel fashion with respect to the switch S1, such that the one closes when the other opens, and vice versa. The switch S3 is arranged on a direct connection path between the input and the output of the cryptocard.

The decrypting unit or card 24 is referred to as "locked" if either or both of the switches S1 and S2 are in blocking position, as in FIG. 2, and as "open" or operative if both of the switches S1 and S2 are closed.

Figure 3:
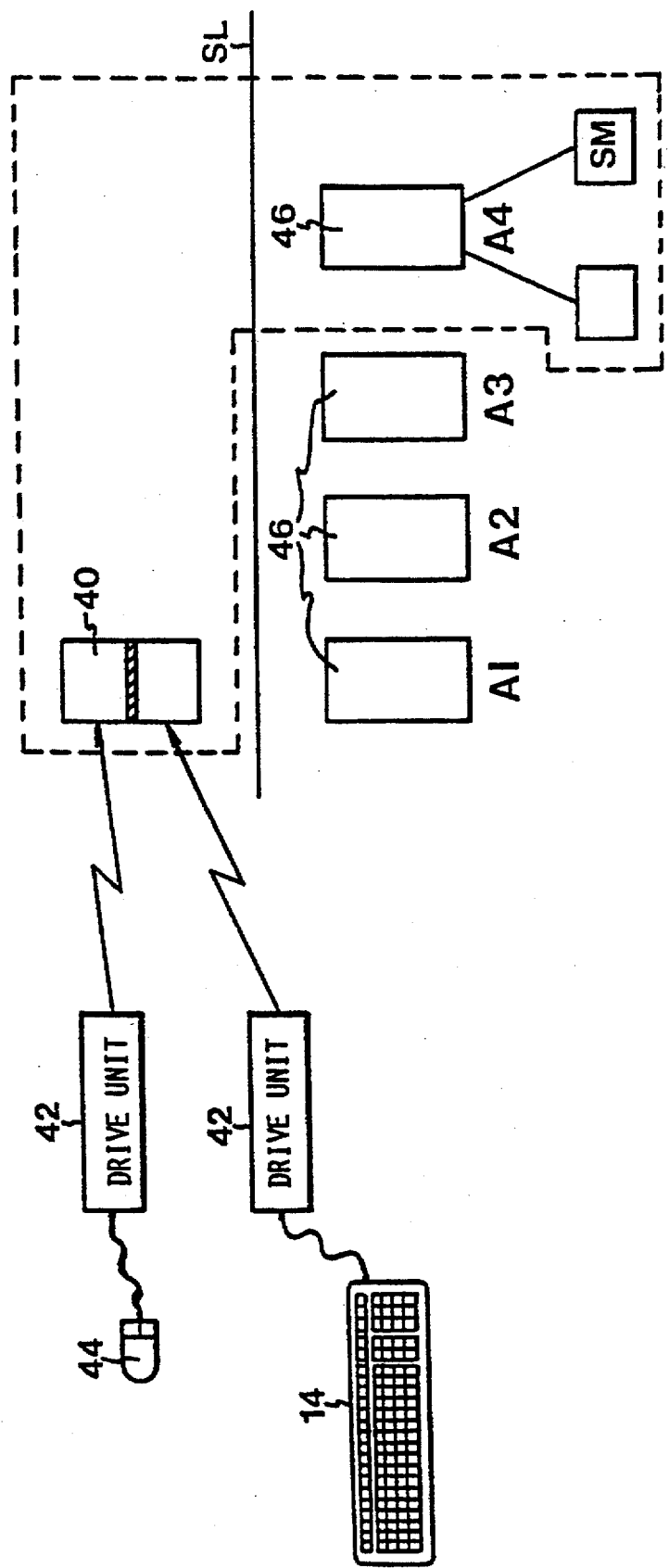
FIG. 3 illustrates the "system-modal operative mode"

In FIG. 3, a horizontal dividing line SL represents the border line between the system level and the application level. On the system level, there is an event queue 40 storing information on various events received from a keyboard 14 or a mouse 44 via drive units 42. The system operates with so-called time slicing, which means that several applications are alternately allotted time in the same processor. Thus, the events stored in the event queue 40 are alternately passed to different application programs or tools A1–A4 on the application level. Each tool has its own event queue designated 46 in FIG. 3.

The tool A4 schematically illustrated in FIG. 3 is a display tool which has been designed with the invention in mind and which enables secure display of decrypted information to a user. This tool may be of "viewer" type, i.e. a tool which essentially or only permits reading and no editing, copying, storage or the like. The other tools A1–A3 may, for instance, be word-processing tools and file-management tools. As mentioned in the foregoing, the tool A4 may be arranged to permit limited printout.

In Windows™, a window may occupy the following four operative modes:
System-modal operative mode
Undivided window
Divided window
Icon The term "system-modal operative mode" has been explained above.

The function of the computer system of FIGS. 1, 2 and 3 for decrypting encrypted information for display or reading will now be described with reference to the flow chart of FIG. 4.

To begin with, the user indicates a password PW1 which, if it is correct, causes the display tool A4 to log in from the CD-ROM. The display tool A4 is stored in non-encrypted form in association with the encrypted information on one and the same CD-ROM, i.e. in an "open" section of the CD-ROM. At this start-up stage, the cryptocard 24 is locked, both of the switches S1 and S2 being in the blocking (open) position, but the non-encrypted tool A4 may nevertheless pass through the initially-closed switch S3 of the cryptocard 24. The display tool A4 is now active.

Then, the user selects the function "read text" & "open crypto". The tool A4 requests the input of a new user password PW2. As a result, the display tool A4 is made to occupy a system-modal operative mode, which is designated SM in FIG. 3. The other tools A1–A3 are thus blocked, such that their user functions become inaccessible to the user for as long as the display tool A4 is system-modal.

That the display tool A4 is brought to a system-modal operative mode here means that the event queue 40 on the system level is emptied merely of events concerning the display tool A4. This is indicated by dashed lines in FIG. 3.

Figure 4:
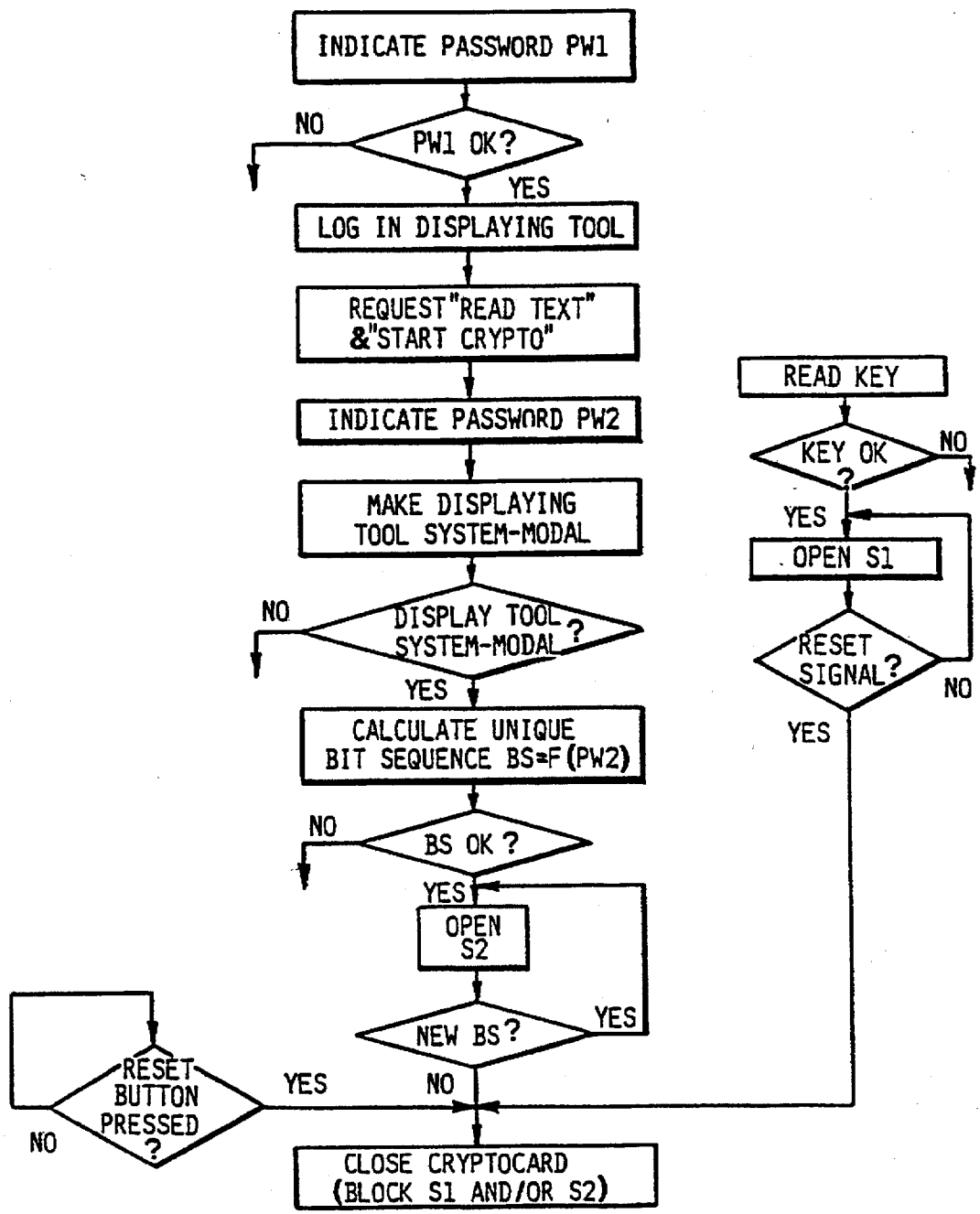
FIG. 4 is a flow chart illustrating the function of the invention.

In the next step of the flow chart in FIG. 4, the display tool A4 itself checks that it occupies a system-modal operative mode. If this is the case, the tool A4 calculates a bit sequence BS on the basis of an algorithm hidden in its executable file and as a function of the password PW2. For security reasons, the bit sequence BS is not checked in the display tool A4, since this would entail the risk of a breach of security owing to tampering with the corresponding program lines, but the bit sequence BS is, without being checked, transmitted as an input signal to the cryptocard 24.

In the cryptocard 24, the bit sequence BS is inputted to the bit-sequence comparator 34, which checks whether the bit sequence BS received corresponds to a predetermined unique bit sequence or to one of several predetermined bit sequences. If the bit sequence BS is accepted, the switch S2 is forced into the closed position.

During the above step of the flow chart in FIG. 4, the user reads the decryption key 26 by means of the pen reader 18, and if the key comparator 32 accepts the key 26, the switch S1 is forced into the closed position.

The cryptocard 24 is now open, and the encrypted information can be decrypted by the circuit 30 and displayed on the display device 12 with the aid of the display tool A4. It should be observed that the switch S3 is brought to the (open) blocking position when the switch S1 is brought to the closed position, for which reason all information read from CD-ROM now has to pass through the decrypting circuit 30. In the event that the information to be read from CD-ROM is alternately encrypted and non-encrypted, the decrypting circuit 30 may be provided with two internal signal paths for, respectively, encrypted and non-encrypted information. If all non-encrypted information is stored on another unit and is not read through the cryptocard 24, the switch S3 may be dispensed with.

In the event that the display tool A4 has no functions of its own for copying, storage and the like, the user cannot, despite the fact that the cryptocard now is open, save any decrypted version of the information for future use, and the decrypted information can only be read on the display device 12. As mentioned in the foregoing, the display tool A4 may, however, be provided with user functions for limited printout of the decrypted information.

If the user signals to the display tool A4 that he wishes to employ another functionality, for example the functions of the tool A1 or the functions on the operating-system level, such as the command XCOPY, the display tool emits a RESET signal received by the RESET comparator 38 which, after checking the signal, forces the switch S1 into the blocking position, thus blocking all decrypting functions. It is only then that the tool A4 leaves its system-modal status and "lets in" other tools. When the user again wishes to have access to decrypted information, passwords have to be inputted again.

For security reasons, the decrypting function only remains open if the unique bit sequence BS is repeated at set intervals. Thus, the tool A4 repeatedly generates the bit sequence BS at set intervals, and the watchdog 36 receives a trigger signal Tr from the bit-sequence comparator 34 each time an accepted, unique bit sequence is transmitted to the card. If the trigger signal Tr is not received within a given time, the watchdog 36 transmits an interrupt signal to the switch S2, forcing the latter open into the blocking position. In this manner, there is no risk of the decrypting function remaining open (operative) after a "crash".

For security reasons, the encrypted information is preferably stored on a non-writable medium, such as CD-ROM, and not on e.g. a floppy disc. CD-ROM further has the advantage of accommodating the display tool on the same medium.

The invention can be modified in many ways within the scope of the appended claims.

For instance, the password algorithm can be varied or dispensed with. The functions for checking the bit sequence can be varied, as can the frequency of the bit sequence. The structure of the cryptocard may differ considerably from that illustrated schematically in the drawings. In particular, several of the units can be integrated in a single unit, and the entire cryptocard may also be implemented on the motherboard itself. Further, the display tool may be stored on some other medium, and e.g. be available on hard disc in the computer.

One variant is provided with special keys which, when read and accepted, cause the two switches S1 and S2 to be closed, regardless of whether the user has indicated any password. In this case, the predetermined enabling signal to the decrypting unit may be regarded as part of the information content of the decryption key. If this variant of the invention is to work, the watchdog 36 must not, when it does not receive any trigger signal Tr, interrupt the connection between the input of the cryprocard 24 for encrypted information and the input of the decrypting circuit 30. This can be achieved in many ways. One alternative is to have the key comparator 32 block the watchdog function when reading such a special key, thus preventing the watchdog 36 from interrupting the connection through S2. Another alternative is to provide a fourth switch S4 (not shown) in parallel with the switch S2, and having the key comparator 32 cause the fourth switch S4 to occupy the closed position if such a special key is being read. In this variant of the invention, the cryptocard 24 can be locked manually with the aid of the RESET button 40.

I claim:

1. A computer system for managing encrypted information, said computer system comprising:

a decrypting unit for receiving encrypted information and being operable in a converting state in which it converts said encrypted information into corresponding decrypted information, or in a non-converting state in which no decryption of said encrypted information is possible by said decrypting unit, said decryption unit being operable in the converting state only if it receives a predetermined external decryption key; and a display tool for displaying said decrypted information to a user;

wherein said decrypting unit passes from the non-converting state to the converting state only upon receipt of a predetermined enabling signal in addition to the predetermined external key;

wherein said display tool operates in a system-modal operative mode for displaying the decrypted information; and wherein the predetermined enabling signal being emitted from said display tool to said decrypting unit, however only if said display tool occupies the system-modal operative mode.

2. A computer system as set forth in claim 1, wherein the display tool offers no user functions of its own for copying or storage of the decrypted information.

3. A computer system as set forth in claim 1, wherein said display tool, when leaving the system-modal operative mode and, as a result, ceases to emit the enabling signal to said decrypting unit, emits a resetting signal to said decrypting unit in order to compel the latter to pass from the converting state to the non-converting state.

4. A computer system as set forth in claim 1, wherein said display tool passes to the system-modal operative mode in response to a predetermined user password being input to said computer system.

5. A computer system as set forth in claim 4, wherein said display tool generates the predetermined enabling signal as a function of the predetermined user password.

6. A computer system as set forth in claim 1, wherein said decrypting unit comprises a watchdog timer for monitoring the reception by said decrypting unit of the predetermined enabling signal in order to force said decrypting unit into the non-converting state if the predetermined enabling signal is not received before said watchdog timer expires.

7. A computer system as set forth in claim 6, wherein the predetermined enabling signal consists of a unique bit sequence which is repeatedly generated at given intervals by the display tool, and wherein said watchdog timer forces said decrypting unit into the non-converting state if the unique bit sequence is not repeatedly received within said given intervals.

8. A computer system as set forth in claim 1, wherein at least portion of said decrypting unit is implemented as hardware.

9. A computer system as set forth in claim 1, wherein said computer system and said display tool operate with Windows-type applications programs.

10. A computer system as set forth in claim 1, further comprising a storage medium for storing the encrypted information, said display tool being prestored, at least initially, in a non-encrypted form on said storage medium.

11. A computer system as set forth in claim 10, wherein said storage medium is a non-writable storage medium.

12. A computer system as set forth in claim 10, wherein said storage medium is of CD-ROM type.

13. A decrypting unit for use in a computer system and for receiving encrypted information, said decryption unit being operable either in a converting state in which it converts said encrypted information into corresponding decrypted information, or in a non-converting state in which no decryption of said encrypted information is possible by said decryption unit, said decryption unit being operable in the converting state only if it receives a predetermined external decryption key, said decrypting unit being able to pass from the non-converting state to the converting state only if it receives a predetermined enabling signal in addition to the predetermined external key.

14. A decrypting unit as set forth in claim 13, further comprising a watchdog timer for monitoring whether said decrypting unit receives the predetermined enabling signal, in order to force said decrypting unit into the non-converting state if the enabling signal is not received before said watchdog timer expires.

15. A decrypting unit as set forth in claim 13, wherein at least a portion of said decrypting unit is implemented as hardware.

* * * * *